United States Patent
Smith et al.

(10) Patent No.: US 8,498,658 B2
(45) Date of Patent: Jul. 30, 2013

(54) TECHNIQUES AND SYSTEMS FOR PROVIDING DATA OVER POWER IN COMMUNICATIONS BASED ON TIME REVERSAL

(75) Inventors: David F. Smith, Ellicott City, MD (US); Anis Husain, San Diego, CA (US)

(73) Assignee: Ziva Corporation, San Diego, CA (US)

( * ) Notice: Subject to any disclaimer, the term of this patent is extended or adjusted under 35 U.S.C. 154(b) by 0 days.

(21) Appl. No.: 13/142,250

(22) PCT Filed: Sep. 3, 2010

(86) PCT No.: PCT/US2010/047919
§ 371 (c)(1),
(2), (4) Date: Aug. 5, 2011

(87) PCT Pub. No.: WO2011/029072
PCT Pub. Date: Mar. 10, 2011

(65) Prior Publication Data
US 2012/0155515 A1    Jun. 21, 2012

Related U.S. Application Data

(60) Provisional application No. 61/239,761, filed on Sep. 3, 2009, provisional application No. 61/239,765, filed on Sep. 3, 2009.

(51) Int. Cl.
*H04B 7/00* (2006.01)
*H04B 15/00* (2006.01)

(52) U.S. Cl.
USPC .......... 455/506; 455/500; 455/504; 455/63.1; 455/65; 455/67.11; 455/67.13; 455/561; 455/114.2; 455/296; 375/141; 375/143; 375/152; 375/242; 375/245; 375/346; 375/347; 375/348

(58) Field of Classification Search
USPC ................ 455/25, 39, 41.2, 500, 504, 505, 455/506, 63.1, 63.4, 65, 67.11, 67.13, 67.15, 455/67.16, 561, 114.2, 296; 375/141, 143, 375/152, 229, 232, 242, 245, 346, 347, 348
See application file for complete search history.

(56) References Cited

U.S. PATENT DOCUMENTS

| | | |
|---|---|---|
| 5,092,336 A | 3/1992 | Fink |
| 5,371,760 A | 12/1994 | Allen et al. |

(Continued)

FOREIGN PATENT DOCUMENTS

| | | |
|---|---|---|
| CN | 101098163 A | 1/2008 |
| EP | 1628414 A2 | 2/2006 |

(Continued)

OTHER PUBLICATIONS

H. Nguyen et al., "Antenna Selection for Time Reversal MIMO UWB Systems" In: Proceedings of IEEE 69th Vehicular Technology Conference, Apr. 26-29, 2009.

(Continued)

*Primary Examiner* — Tuan A Tran
(74) *Attorney, Agent, or Firm* — Perkins Coie LLP

(57) ABSTRACT

Techniques, apparatuses and systems for providing communications based on time reversal of a channel impulse response of a pulse in a transmission channel between a transmitter and a receiver to enhance reception and detection of a pulse at the receiver against various effects that can adversely affect and complicate the reception and detection of the pulse at the receiver.

8 Claims, 8 Drawing Sheets

U.S. PATENT DOCUMENTS

| | | | |
|---|---|---|---|
| 5,428,999 A | | 7/1995 | Fink |
| 5,431,053 A | | 7/1995 | Fink |
| 5,715,282 A | * 2/1998 | Mansouri et al. ............. 375/350 |
| 5,859,870 A | * 1/1999 | Tsujimoto ..................... 375/143 |
| 5,926,768 A | * 7/1999 | Lewiner et al. ............ 455/562.1 |
| 6,434,366 B1 | * 8/2002 | Harrison et al. ................ 455/69 |
| 7,324,606 B2 | 1/2008 | Eilts et al. |
| 7,340,016 B2 | * 3/2008 | Hui ............................... 375/347 |
| 7,346,280 B1 | 3/2008 | Sguazzotti et al. |
| 7,362,829 B2 | * 4/2008 | Ojard ............................ 375/346 |
| 7,460,605 B2 | 12/2008 | Candy et al. |
| 7,463,690 B2 | 12/2008 | Candy et al. |
| 7,587,291 B1 | * 9/2009 | Sarvazyan et al. ............ 702/103 |
| 7,653,137 B2 | 1/2010 | Fink et al. |
| 8,023,904 B2 | * 9/2011 | Viswanath et al. ............. 455/91 |
| 8,195,112 B1 | * 6/2012 | Zhang et al. ............... 455/127.2 |
| 2001/0038478 A1 | 11/2001 | Hwang |
| 2003/0138053 A1 | * 7/2003 | Candy et al. ................... 375/259 |
| 2004/0013211 A1 | 1/2004 | Lindskog et al. |
| 2004/0014498 A1 | 1/2004 | Grego |
| 2004/0032917 A1 | 2/2004 | Hwang et al. |
| 2004/0059265 A1 | 3/2004 | Candy et al. |
| 2004/0156443 A1 | 8/2004 | Dent |
| 2004/0196926 A1 | 10/2004 | Chien et al. |
| 2004/0258356 A1 | 12/2004 | Brice et al. |
| 2005/0036787 A1 | 2/2005 | Lee et al. |
| 2005/0047785 A1 | 3/2005 | Hwang et al. |
| 2006/0098746 A1 | * 5/2006 | Candy et al. ................... 375/259 |
| 2006/0115031 A1 | * 6/2006 | Lindskog et al. ............. 375/348 |
| 2008/0045864 A1 | 2/2008 | Candy et al. |
| 2010/0085902 A1 | 4/2010 | Phan Huy et al. |

FOREIGN PATENT DOCUMENTS

| | | |
|---|---|---|
| JP | 2001-324654 A | 11/2001 |
| JP | 2006-211308 A | 8/2006 |
| WO | WO-94/18752 A1 | 8/1994 |
| WO | WO-01/10156 A1 | 2/2001 |
| WO | WO-02/05436 A2 | 1/2002 |
| WO | WO-02/23760 A1 | 3/2002 |
| WO | WO-2009/156703 A2 | 12/2009 |
| WO | WO-2009/156705 A2 | 12/2009 |
| WO | WO-2010/042319 A2 | 4/2010 |
| WO | WO-2010/074782 A2 | 7/2010 |
| WO | WO-2011/029072 A2 | 3/2011 |
| WO | WO-2011/029075 | 3/2011 |

OTHER PUBLICATIONS

P. Gysel, and R. Staubli, "Statistical Properties of Rayleigh Backscattering in Single-Mode Fibers", J. Lightwave Technol., LT-8 (1990), pp. 561-567.

* cited by examiner

TECHNIQUES AND SYSTEMS FOR PROVIDING DATA OVER POWER IN COMMUNICATIONS BASED ON TIME REVERSAL

PRIORITY CLAIMS AND RELATED PATENT APPLICATIONS

This patent document claims, under 35 U.S.C. 119(e), the benefits and priorities of the following two U.S. provisional applications: (1) U.S. Provisional Patent Application No. 61/239,765, filed on Sep. 3, 2009, entitled "TECHNIQUES AND SYSTEMS FOR PROVIDING DATA OVER POWER," and (2) U.S. Provisional Patent Application No. 61/239,761, filed on Sep. 3, 2009, entitled "TECHNIQUES AND SYSTEMS FOR COMMUNICATIONS BASED ON TIME REVERSAL PRE-CODING."

The entire disclosures of the above referenced applications are incorporated by reference as part of this document.

TECHNICAL FIELD

The subject matter described in this document relates to communications, including radio frequency (RF) wireless transceiver devices, and RF communication systems and networks.

BACKGROUND

Radio frequency (RF) wireless communications use wireless transfer of RF waves to communicate and transfer information and can be used in a wide range of applications. For example, RF wireless communications can be used to provide interactive broadband access for data and file transfer, GPS services, web surfing, video capture, streaming video, Internet commerce, Internet gaming, and electronic books. Other examples for applications of RF wireless communications include radar, RF imaging, space communications, RF targeting, RF sensor networks, RF surveillance, and various uses of wirelessly directing RF waves from one location to another. Some specific uses of RF wireless communications are static and mobile RFIDs, inventory tracking and control, and security monitoring at security checkpoints such as airports and shipping ports.

RF wireless signals can be transmitted between two communication devices or nodes through a transmission channel. The transmission channel includes the electronics and antennas of an RF transmitter at the first node. The actual transmission medium is also part of the transmission channel, including various objects which reflect or scatter the wireless RF signals. Also part of the transmission channel are the electronics and antennas of an RF receiver at the second node. Interactions, such as reflecting and scattering, with any encountered objects which are part of the transmission channel can affect the transmission of the wireless RF signal to the RF receiver and the detection of the received wireless RF signal at the RF receiver.

SUMMARY

Techniques, apparatuses and systems are described for providing communications based on time reversal of a channel impulse response of a pulse in a transmission channel between a transmitter and a receiver to enhance reception and detection of a pulse at the receiver against various effects that can adversely affect and complicate the reception and detection of the pulse at the receiver.

In one aspect, a method for communications is provided to include emitting, at a base, an impulse-pulse s(t) to provide copies of the emitted impulse-pulse s(t) to at least one remote target;

in response to emitting the impulse-pulse s(t), detecting at the base a self-convolved impulse response, h(t)*h(t), from the at least one remote target, wherein:

a channel impulse response, h(t), comprises copies of the emitted impulse-pulse s(t), each copy of the impulse-pulse s(t) provided to the at least one remote target at a different time based on a length of a respective path traveled by the respective copy of the impulse-pulse s(t) through a communication channel between the base and the at least one remote target; and the self-convolved impulse response, h(t)*h(t), comprises a copy of the channel impulse response h(t) for each copy of the impulse-pulse s(t) included in the channel impulse response h(t) and reflected at the at least one remote target;

reversing at the base in time domain the self-convolved impulse response, h(t)*h(t);

transmitting the time reversed self-convolved impulse response, h(−t)*h(−t), from the base to the at least one remote target; and detecting at the base a returned impulse-pulse, $s_R(t)$, from the at least one remote target, wherein:

the returned impulse-pulse, $s_R(t)$, comprises copies of the impulse-pulse s(t) included in a time reversed channel impulse response, h(−t) reflected at the at least one remote target, each copy of the impulse-pulse s(t) provided to the base at the same time; and the time reversed channel impulse response, h(−t), comprises respective copies of the impulse-pulse s(t) formed at the at least one remote target from the copies of the impulse-pulses s(t) included in the transmitted time reversed self-convolved impulse response, h(−t)*h(−t) provided to the at least one remote target at respectively the same time.

In another aspect, a method for communications is provided to include:

at a base that transmits and receives communication signals,
emitting an impulse-pulse s(t) in multiple directions;

in response to emitting the impulse-pulse s(t), detecting at a first angular orientation and over a first solid-angle a channel impulse response, h(t), reflected from a remote target, wherein:

the first angular orientation comprises first 3-D angular coordinates, (θ, φ), in a coordinate system with an origin at the base;

the channel impulse response, h(t), comprises copies of the impulse-pulse s(t), each copy of the impulse-pulse s(t) provided to the remote target at a different time based on a length of a respective path traveled by the respective copy of the impulse-pulse s(t) through a communication channel between the base and the remote target;

reversing in time domain the channel impulse response h(t);

amplifying the time reversed channel impulse response h(−t);

transmitting in the multiple directions the amplified time reversed channel impulse response, Gh(−t); and detecting from the multiple directions an amplified channel impulse response, Gh(t), based on residual portions of an amplified impulse-pulse Gs(t) reflected from the remote target, wherein the amplified impulse-pulse Gs(t) comprises copies of the impulse-pulses s(t) included in the transmitted amplified time reversed channel impulse response, Gh(−t) provided to the remote target at the same time.

In another aspect, a base device for communications is provided to include
   a receiver comprising:
   an antenna to operate in one of two modes comprising:
      a scanning mode to detect a channel impulse response, h(t), reflected from a remote target, wherein the channel impulse response, h(t), comprises copies of an impulse-pulse s(t) emitted by the base, each copy of the impulse-pulse s(t) provided to the remote target at a different time based on a length of a respective path traveled by the respective copy of the impulse-pulse s(t) through a communication channel between the base and the remote target; and
      an omnidirectional mode to detect an amplified channel impulse response, Gh(t), based on residual portions of an amplified impulse-pulse Gs(t) reflected from the remote target, wherein the amplified impulse-pulse Gs(t) comprises copies of impulse-pulses s(t) included in a transmitted amplified time reversed channel impulse response, Gh(−t) provided to the remote target at the same time;
   an analog-to-digital converter (ADC) coupled to the antenna to digitize the detected channel impulse response h(t) into a channel impulse response waveform;
   a waveform processor communicatively coupled to the receiver, the waveform processor to reverse in time domain the channel impulse response waveform; and
   an omnidirectional transmitter communicatively coupled to the waveform processor and comprising a high-power amplifier, the omnidirectional transmitter to emit:
      the impulse-pulse, s(t); and
      the amplified time reversed channel impulse response, Gh(−t).

In another aspect, a method for communications is provided to include:
   emitting an impulse-pulse s(t) in multiple directions;
   in response to emitting the impulse-pulse s(t), detecting at a first angular orientation and over a first solid-angle a channel impulse response, h(t), reflected from a remote target, wherein:
      the first angular orientation comprises first 3-D angular coordinates, (θ, φ), in a coordinate system with an origin at the base;
      the channel impulse response, h(t), comprises copies of the impulse-pulse s(t), each copy of the impulse-pulse s(t) provided to the remote target at a different time based on a length of a respective path traveled by the respective copy of the impulse-pulse s(t) through a communication channel between the base and the remote target;
   reversing in time domain the channel impulse response h(t);
   amplifying the time reversed channel impulse response h(−t);
   transmitting in multiple directions the amplified time reversed channel impulse response, gh(−t);
   detecting at the first angular orientation and over the first solid-angle an amplified impulse-pulse, gs(t) reflected from the remote target, wherein the amplified impulse-pulse, gs(t) comprises copies of the impulse-pulses s(t) included in the transmitted amplified time reversed channel impulse response, gh(−t) provided to the remote target at the same time; and subsequently,
   detecting at the first angular orientation and over the first solid-angle a data stream, s(t), emitted by the remote target.

In another aspect, a base device is provided to include:
   a receiver comprising:
   an antenna comprising a scanning mode to detect:
      a channel impulse response, h(t), reflected from a remote target, wherein the channel impulse response, h(t), comprises copies of an impulse-pulse s(t) emitted by the base, each copy of the impulse-pulse s(t) provided to the remote target at a different time based on a length of a respective path traveled by the respective copy of the impulse-pulse s(t) through a communication channel between the base and the remote target;
      an amplified impulse-pulse, gs(t) reflected from the remote target, wherein the amplified impulse-pulse gs(t) comprises copies of impulse-pulses s(t) included in a transmitted amplified time reversed channel impulse response, gh(−t) provided to the remote target at the same time; and
      a data stream, s(t), emitted by the remote target; and
   an analog-to-digital converter (ADC) coupled to the antenna, the ADC to digitize the detected channel impulse response h(t) into a channel impulse response waveform;
   a waveform processor communicatively coupled to the receiver, the waveform processor to reverse in time domain the channel impulse response waveform; and
   an omnidirectional transmitter communicatively coupled to the waveform processor and comprising an amplifier, the omnidirectional transmitter to emit:
      the impulse-pulse, s(t); and
      the amplified time reversed channel impulse response, gh(−t).

In another aspect, a method is provided to include:
   at a base,
      emitting an impulse-pulse s(t) in multiple directions;
      in response to emitting the impulse-pulse s(t), detecting at a first angular orientation and over a first solid-angle a channel impulse response, h(t), reflected from a remote target, wherein:
         the first angular orientation comprises first 3-D angular coordinates, (θ, φ), in a coordinate system with an origin at the base;
         the channel impulse response, h(t), comprises copies of the impulse-pulse s(t), each copy of the impulse-pulse s(t) provided to the remote target at a different time based on a length of a respective path traveled by the respective copy of the impulse-pulse s(t) through a communication channel between the base and the remote target;
      reversing in time domain the channel impulse response h(t);
      amplifying the time reversed channel impulse response h(−t); and
      transmitting in the multiple directions the amplified time reversed channel impulse response, Gh(−t).

In yet another aspect, a system for wireless communications is provided to include:
   one or more RF base stations, each RF base station being an RF transceiver that wirelessly transmits and receives RF signals; and
   one or more RF target stations, each RF target station in wireless communication with the one or more RF base stations,
      wherein each RF base station includes a base station receiver, a base station transmitter, an analog-to-digital converter (ADC) and a waveform processor,
      wherein the base station receiver includes an antenna to operate in one of a scanning mode and an omnidirectional mode, wherein the antenna in the scanning mode detects a channel impulse response, h(t), reflected from a RF target station and having copies of an impulse-pulse s(t) emitted by the base station transmitter, each copy of the impulse-pulse s(t) provided to the remote target at a different time based on a length of a respective path traveled by the respective copy of the impulse-pulse s(t) through a communication channel between the RF base station and the RF target station, wherein the antenna in the omnidirectional mode detects an amplified channel impulse response, Gh(t), based on residual portions of an amplified impulse-pulse Gs(t) reflected from the RF target station and having copies of impulse-pulses s(t) included in a transmitted amplified time reversed channel impulse response, Gh(−t) provided to the RF target station at the same time;

wherein the ADC is coupled to the antenna to digitize the detected channel impulse response h(t) into a channel impulse response waveform;

wherein the waveform processor is communicatively coupled to the receiver and to reverse in time domain the channel impulse response waveform; and wherein the base station transmitter is an omnidirectional transmitter communicatively coupled to the waveform processor and emits the impulse-pulse, s(t); and the amplified time reversed channel impulse response, Gh(−t).

The techniques, apparatus and systems described in this document can optionally provide one or more of the following advantages. Based on time reversal of the channel impulse response of a pulse in a transmission channel between a transmitter and a receiver, reception and detection of a pulse at the receiver can be enhanced against various effects that can adversely affect and complicate the reception and detection of the pulse at the receiver.

BRIEF DESCRIPTION OF DRAWINGS

These and other aspects will now be described in detail with reference to the following drawings.

Like reference symbols in the various drawings indicate like elements.

DETAILED DESCRIPTION

Figure 1:
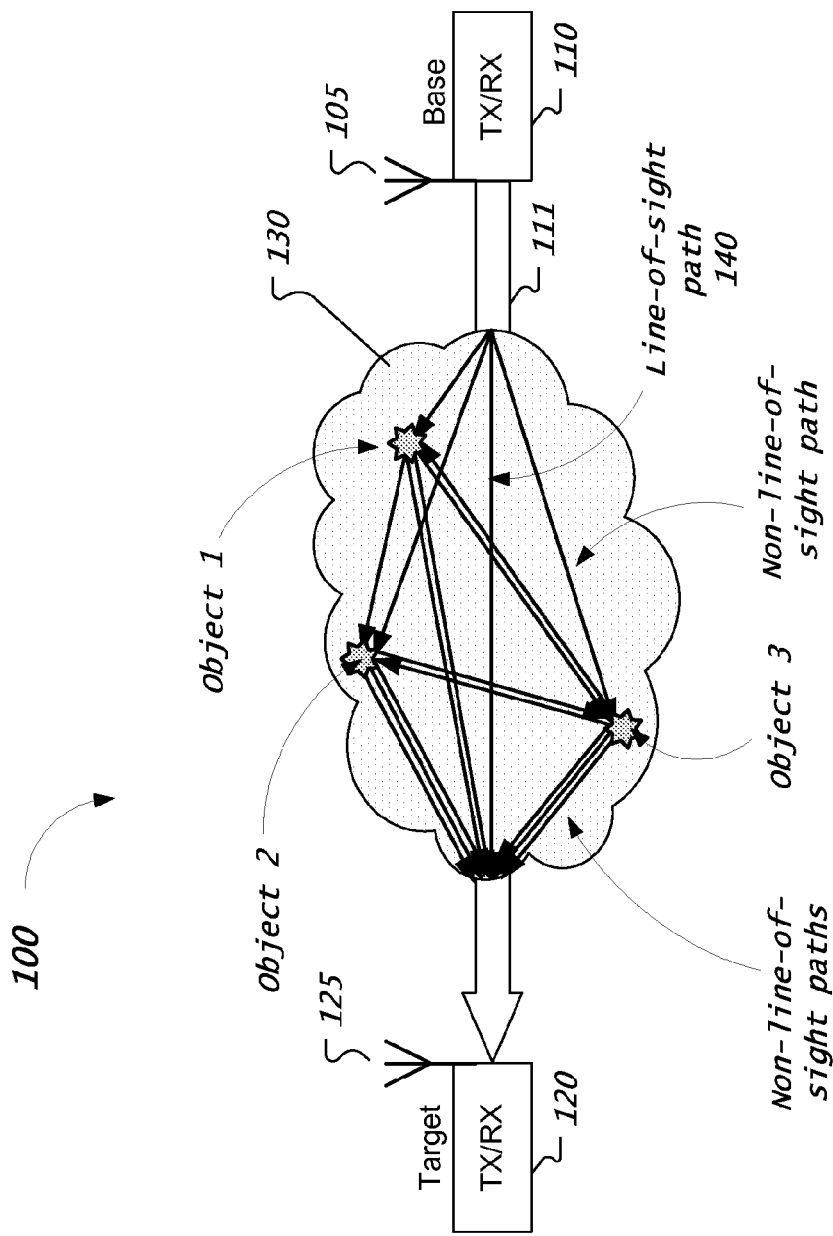
FIG. 1 represents a communications system including a target and a base.

A communication signal in a communication system can be affected by various effects during transmission, such as multipath scattering and reflections in various RF wireless communication systems. These effects can cause the energy of a short pulse or other coded sequence generated at a first location, e.g., a transmitter, to split into different portions along different paths and arrive at a second location, e.g., a receiver, over a period of time longer than the original pulse duration where different portions arrive at the second location at different times.

In an RF communication system, an RF pulse can be emitted from the transmitter's antenna (e.g., an omni-directional antenna) at the first location and received by the receiver's antenna (e.g., an omni-directional antenna) at the second location. A wave representing the pulse can interact with different objects and such interactions cause different portions from the original wave to travel along different paths. The portion of the wave that travels along the line of sight between the transmitter and receiver in a homogeneous medium arrives at the second location before arrival of other portions of the wave. The other portions of the wave are detected by the receiver at the second location after these other portions of the wave are scattered or reflected towards the second location by various objects in the transmission channel. Such other portions of the wave may have different signal strengths, different polarization, modified pulse shapes and different delays relative to the portion of the wave that arrives at the receiver along the line of sight between the transmitter and receiver.

Delays can also result from the different frequency components of a signal taking different amounts of time to propagate between terminals of the antenna and different physical locations on the antenna. These delays are referred to as dispersion to distinguish them from multipath delays.

The foregoing multipath transmission can be described alternatively as a process where the pulse emitted by the transmitter at the first location is effectively broken into a set of copies of itself that travel along their respective paths, each copy being delayed by some time due to the respective total length of its own respective path before arriving at the receiver. The number of copies arriving at the receiver corresponds to the number of paths that (i) connect the first location with the second location, and that (ii) pass through zero, one or more scattering or reflecting centers in the transmission channel. Each copy of the pulse emitted at the first location arrives at the second location at a different time in accordance to a length of a respective multi scattering path traveled by the respective copy of the emitted pulse through the transmission channel between the transmitter and the receiver. The delayed pulses arriving at the second location may not be exact copies of the original pulse leaving the first location. A channel impulse response h(t), defined as a waveform including the forgoing set of pulse copies, uniquely characterizes the communication channel between the first and second locations.

Techniques, apparatus and systems are described to detect and process the channel impulse response h(t) of a communication system. Once detected and appropriately processed, the channel impulse response h(t) can be used to implement methods based on time reversal for communication of information through a communication channel. Such time reversal communication methods can be performed to communicate the information with high fidelity and strong immunity against multipath and other adverse effects on transmission of information and thus reduce the reliance of, or eliminate the need for, complex filtering or complex data signal processing at the receiving end.

For example, the waveform detected at the second location for the short pulse transmitted from the first location, can be returned through the transmission channel to arrive back at the first location as a short pulse. A transmitter at the second location emits the trailing portions of the detected wave first, while the leading portions of the wave are emitted last. Due to the time reversal properties of wave propagation, only the respective portions of the wave which travel through the transmission channel along the original paths can arrive in phase at the first location. Moreover, because the return paths of the time reversed portions of the wave from the second location to the first location coincide with the forward paths along which the original portions of the wave travel from the first location to the second location, these portions of the waveform emitted from the second location arrive at the first location and overlap with one another in time after applying the delays associated with the time reversal process. Therefore, the transmitter at the second location emits a time reversed signal and effectively produces a pulse that is spatially and temporally focused towards the first location. The wave that is received and detected by a receiver at the first location is essentially a replica of the original pulse but travels in the opposite direction.

In this context, the focusing of the pulse in the time domain includes shortening the time duration of a portion of the signal emitted from the second location to the time duration of the pulse emitted originally from the first location by an antenna such as an omni directional antenna. The spatial focusing of the time reversed pulse includes emitting the wave from the second location and concentrating a portion of the wave energy at the first location. The spatial focusing is effectuated by time reversed emission creating similar conditions as a directional antenna array for beam shaping but without relying on beam shaping elements specific to a directional antenna array.

If the transmitter at the second location emits the time reversed signal repeatedly, a sequence of pulses can be detected at the first location. Therefore, time reversal of waves can be used to establish communications between the transmitter at the second location and the receiver at the first location. The transmitter at the second location focuses each pulse of a data sequence or bit stream at the first location using time reversal emission, thus compensating for noise due to scattering, multipath and dispersive effects. An identical process can be applied to transmit data in the reverse direction.

The techniques, apparatus and systems described in this document apply the time reversal of the channel impulse response of the transmission channel to communications to mitigate various effects adversely affecting the signal transmission in the presence of multipath scattering.

Effect of Channel Impulse Response on Data Transmission

FIG. 1 illustrates an example of a communication system 100 that is subject to multipath scattering or reflections in the transmission medium 130. The base 110 and the target 120 associated with the communication system 100 in FIG. 1 are RF transceivers and each equipped with a transmitter (TX), a receiver (RX) and a suitable antenna (e.g., an omnidirectional antenna). The target omnidirectional antenna 125 can be different from the base omnidirectional antenna 105. The base 110 transmits a data encoded signal 111 to the target 120 via the transmission medium 130. The terms data encoded signal and signal are used interchangeably in the following description. The signal 111 transmitted from the base 110 to the target 120 undergoes scattering from various objects on the line-of-sight and non-line-of-sight paths.

The signal received at the target 120 includes multiple portions that are generated from the original pulse, such as interference contributions due to, for example, multipath scattering, reflections and dispersion delays. Thus, the signal received at the target 120 has a time duration longer than that of the signal 111 provided at the base 110. The signal 111 emitted by the transmitter at the base 110 is denoted s(t). The signal detected by the receiver at the target 120 is denoted q(t), and includes two contributions:

$$q(t)=s(t)*h(t)+n(t) \quad (1)$$

The first term in EQ. 1 corresponds to the convolution between the signal s(t) and the channel impulse response h(t) of the transmission channel. The second term n(t) represents random noise. Random noise can be caused by, for example, a detection or measurement error or signals that reach target antenna 125 but do not originate from base 110. Therefore, the random noise term n(t) in EQ. 1 usually tends to be independent of the transmission path.

The transmission channel includes the entire medium 130 between the base 110 and the target 120, including, e.g., areas out of the line of sight path 140 from the base 110 to the target 120. The channel impulse response h(t) depends on the characteristics of the transmission channel, such as the number of scattering or reflecting objects, their placement and orientation with respect to the line of sight from the base 110 to the target 120. The characteristics of the transmission channel can influence the channel impulse response. In FIG. 1, three scattering or reflecting centers or objects are depicted as examples. Different scattering or reflecting centers cause different scattering or reflecting paths, and the different arrival times of these different paths may lengthen the time duration of the channel impulse response h(t) and implicitly of the received signal q(t).

Scattering or reflecting objects placed away from the line of sight path 140 as illustrated in FIG. 1 cause longer scattering or reflecting non-line-of-sight paths, which lead to lengthening the time duration of h(t) and q(t). Fifteen non-line-of-sight paths are depicted in FIG. 1 as examples in addition to the line-of-sight path 140. Alternatively, if the transmission medium 130 does not contain scattering or reflecting centers and the electronics is optimized, then the channel impulse response due to the path can be close to unity, h(t)=1, when suitably normalized and the signal q(t) received at the target 120 resembles very well the signal s(t) 111 emitted at the base 110. In the absence of scattering or reflecting objects and events and under the above circumstance, the signal detected by the receiver at the target 120 does not have a longer time duration than the signal 111 emitted by the base 110.

In the communication system 100 the transmitter at the base 110 may not have any knowledge of the channel impulse response prior to transmitting signals from the base 110 to the target 120. Therefore, the discrimination and equalization processes needed to extract data from the transmitted signal 111 are performed by the receiver at the target 120. From the perspective of the target 120, both the channel impulse response h(t) and the random noise n(t) represent random processes and are difficult to separately account for.

Time Reversal of Channel Impulse Response

In the exemplary system in FIG. 1, the effects on signal propagation by multipath scattering or reflections in the transmission channel in the medium 130 can be corrected by proper time reversal. A pulse (e.g., an impulse-pulse) submitted from the target 120 is detected by the base 110 after propagation through the transmission channel. The detected pulse experiences the effect of the transmission channel and thus contains information on the characteristics of the transmission channel. Based on the detected pulse, the base 110 can obtain the characteristics or the response of the medium to the propagation of an impulse. The waveform detected by the base 110 is the channel impulse response h(t) characteristic to the transmission channel 130. Assuming T represents a time delay to preserve causality of the signal, when the time reversed channel impulse response h(T−t) is reemitted by the base 110, the pulse arriving back at the target 120 is approximately the original impulse pulse. This time reversed channel impulse response matches and negates the effects of the multipath scattering or reflecting in the propagation medium 130. The convolution between the channel impulse response h(t) and the time reversed channel impulse response h(T−t) is given approximately by the impulse (delta) function:

$$h(t)*h(-t)=\delta(t) \quad (2)$$

The signal s(t) 111 is generated by the transmitter at the base 110. If instead of emitting the signal s(t) 111, the base 110 emits a signal containing the convolution s(t)*h(T−t), then the signal received at the target 120 is given approximately by $$q(t)=[s(t)*h(-t)]*h(t)+n(t)$$

$$q(t)=s(t)*[h(-t)*h(t)]+n(t)=s(t)*\delta(t) \quad (3)$$

As suggested by EQs. 2-3, the signal q(t) detected at the target 120 has been filtered by the transmission channel 130 itself. The signal emitted at the base 110 now contains the time reversed channel impulse response h(T−t), where T represents a time delay to preserve causality of the signal. The time delay T is related to the time it takes the base 110 to receive and reverse in the time domain the signal corresponding to the channel impulse response h(t). As discussed above, the effect of the time reversed channel impulse response h(T−t) is to match and negate the contribution of the channel impulse response h(t). Thus, the effect of the multipath scattering in the transmission channel 130 is cancelled and the signal detected by the receiver at the target 120 is a close replica of the signal s(t) 111 included in the signal emitted by the transmitter at the base 110. It is noted that the result h(t)*h(−t)=s(t) is an approximation and a more accurate representation is $h(t)*h(-t)=s(t)+\Sigma(a_i s(t+\Delta t_i))$ where the term $\Sigma(s(t+\Delta t_i))$ represents other copies of the impulse function s(t) whose time delays are not correctly equalized. In various practical systems, these additional components have much smaller amplitudes $a_i$ than the dominant signal s(t) and hence their effects can be ignored. Hence the final signal at the target 120 appears like a large single impulse with a much smaller extended background.

It is also to be understood that in practical implementations of the system in FIG. 1, the returning impulse function s(t), although its constituent components may be correctly realigned in the time domain, may not be identical in shape to the original outgoing impulse s(t) due to effects resulting from transmission of a signal through an antenna or other electronic components. Since such effects depend on the exact details of the antenna, and can be corrected by signal filtering or processing in post processing electronics, our subsequent discussion will assume that all similar effects have been properly corrected and do not affect the substance or basic operations of the techniques, devices and systems described herein.

Prior to establishing a data transmission based on time reversal, the time reversed channel impulse response h(T−t) of the transmission channel 130 is measured. Subsequently, the data transmission process can be implemented according to EQ. 3.

Acquisition and Time Reversal of Channel Impulse Response

Figure 2:
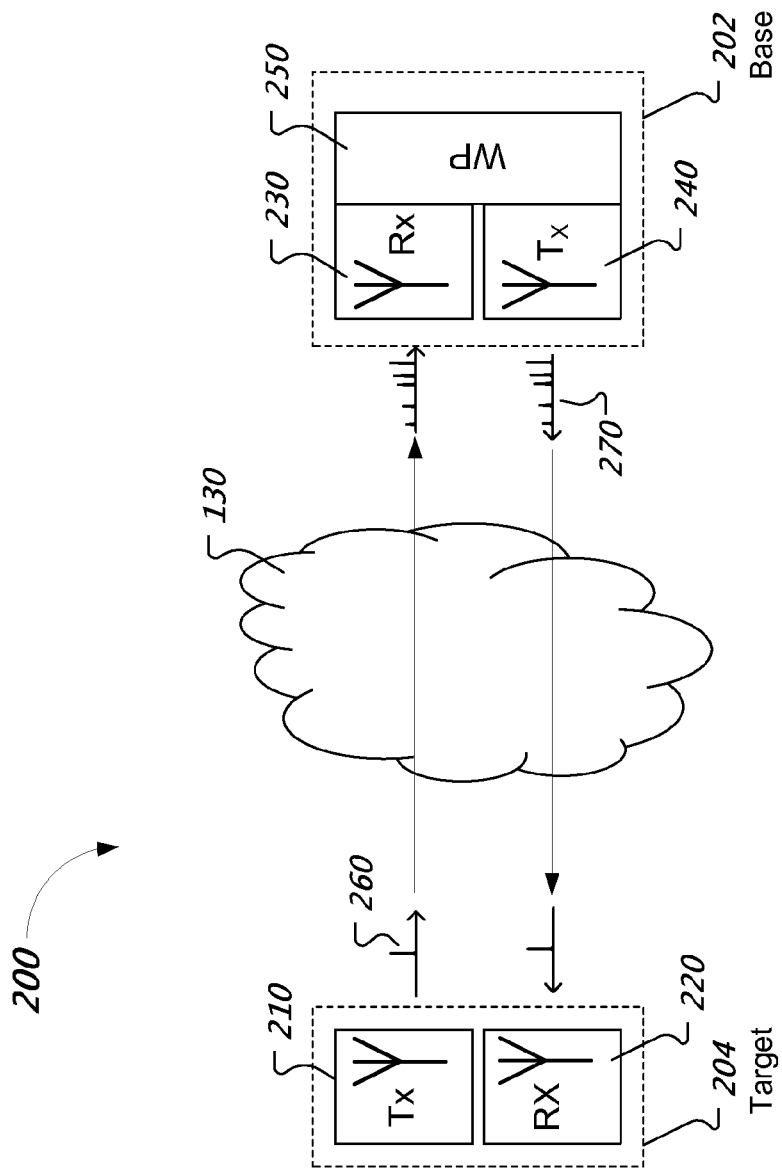
FIG. 2 represents another communications system including a target and a base.

FIG. 2 shows an example of an implementation 200 of the communication system based on time reversal in FIG. 1. The communication system 200 can be configured to include circuit elements and devices that detect, digitize and store the channel impulse response h(t). In real physical systems, it is not possible to separate the channel impulse response h(t) from an actual physical signal s(t)*h(t) since this would require an infinitely narrow pulse s(t). Hence, when this document refers to devices capturing, measuring, digitizing, detecting, transmitting, storing or any other physical operation on the channel impulse response h(t) or h(T−t), it is to be understood that the actual physical signal is s(t)*h(t) or its time reversed version s(T−t)*h(T−t). Hence it is more technically accurate to refer to the channel pulse response. However, for convenience, this document often simply refers to this as h(t) or h(T−t) and refer to it as the channel impulse response since the time reversal effects are only relevant to the h(t) component and not the s(t). An analog-to-digital converter (ADC) is provided to digitize the detected channel impulse response h(t) into a channel impulse response waveform. The system 200 includes a base 202 and a target 204 which exchange signals through a transmission channel via the medium 130. The terms "base" and "target" are used in this document to denote wireless communication devices, base stations or nodes that may be fixed in location or may be mobile. The base and target may be configured to include various communication and signal processing functions and may be transmitter, receivers or transceivers. In some implementations, the "base" and "target" are used interchangeably. In some implementations, a base or base station may be a centrally located in a communication system or network and is configured to include various communication and signal processing functions while a "target" may have less functionality than the base station but may be more mobile under some circumstances.

The target 204 is equipped, among other things, with a target-TX 210, a target-RX 220 and an antenna 125. The antenna may be an omnidirectional antenna, but other suitable antenna types can be used. The target-TX 210 emits an impulse pulse 260, which can be a delta pulse, or another pulse shape that allows the different paths from the target 204 to the base 202 via different scatterers or reflectors to be uniquely resolved in the channel impulse response h(t). This impulse pulse 260 (also referred to as channel mapping impulse, or simply probe pulse) passes through the medium 130, interacting with scattering and multipath elements and arrives at the base 202. In some implementations, the probe pulse can have a predetermined shape, e.g., a delta pulse, a Gaussian pulse, etc. In other implementations, the probe signal can include a sequence of a predetermined number of pulses where each pulse has an associated shape and is separated by associated predetermined time intervals.

The base 202 includes a receiver base-RX 230, a transmitter base-TX 240, an antenna 105 and a waveform processing unit 250 (WP). The antenna may be an omnidirectional antenna, but other antenna types can be used. A set of copies of the emitted pulse 260 from the target 204 and detected by the base-RX 230 defines the channel impulse response h(t) of the transmission channel 130.

The base-RX 230 includes an analog-to-digital converter (ADC) coupled to the antenna which digitizes the channel impulse response h(t) in a high speed sampling circuit with the waveform processor 250. The waveform processor 250 stores the channel impulse response waveform h(t) in a memory unit. The waveform processor 250 then reverses in time domain the channel impulse response waveform h(t) to generate a time reversed channel impulse response waveform h(T−t) 270. In some implementations, in addition to the channel impulse response waveform h(t), the time reversed channel impulse response waveform h(T−t) may also be stored in the waveform processing unit 250. In yet another implementation, only the time reversed channel impulse response waveform h(T−t) 270 is stored in the waveform processing unit 250, and not the channel impulse response waveform h(t). In one aspect, the waveform processing unit 250 stores the channel impulse response waveform h(t) in a last-in-first-out (LIFO) buffer. Therefore, the time reversal step is built in as a property of the LIFO buffer: The channel impulse response waveform h(t) goes into the LIFO buffer for storage, and the time reversed channel impulse response waveform h(T−t) 270 comes out of the LIFO buffer upon accessing the buffer.

Upon receiving the signal from the target 204, the base-TX 240 can emit the stored time reversed channel impulse response h(T−t) 270. When for example the medium is linear and reciprocal, the signal emitted at the base 202, which includes the time reversed channel impulse response h(T−t) 270, arrives at the target 204 with all transmission delays removed, as shown in EQ. 2. The target-RX 220 detects a pulse that resembles the original impulse pulse 260. As discussed regarding EQ. 2, the original temporal shape of the pulse 260 is preserved upon return to the target 204.

In some implementations of the communication system 200, the target-TX 210 and the base-TX 240 are configured to emit analog signals, while the base-RX 230 is configured to receive analog signals. In contrast the target-RX 220 can be configured to receive digital signals. In another exemplary implementation of the communication system 200, the target-RX 220 can be configured to receive analog signals.

In some implementations of the communication system 200 the target-TX 210 and the base-TX 240 are configured to emit digital signals, while the base-RX 230 and the target-RX 220 are configured to receive digital signals.

In another aspect, impulse (or probe) signals can also be transmitted by the base station 202 and data signals can also be transmitted by the target 204. Such a configuration enables impulse and data signal flow in both directions, as described with respect to examples in FIGS. 4-6 below.

Temporal focus and spatial focus are obtained for the communications system 200. The pulse 260 emitted by the target 204 as a wave is reflected or sent back by the base 202 after time reversal operation at the base 202. The reflected and time reversed pulse returns precisely at the target 204 location, because only at the target 204 location the portions of the wave scattered or reflected within the transmission channel 130 can add up in phase, both spatially and temporally.

Data Transmission from Base to Target

In the exemplary system in FIG. 2, once the channel impulse response h(t) of the transmission channel through the medium 130 is determined and the time reversed channel impulse response waveform h(T−t) is stored by the base 202, the characterization process of the transmission channel through the medium 130 is completed. Based on the stored time reversed channel impulse response waveform h(T−t) at the base 202, the communication system 200 can be configured and operated for data transmission with high transmission fidelity. In this implementation, a data channel is integrated into the base-TX 240 of the communication system 200.

Figure 3:
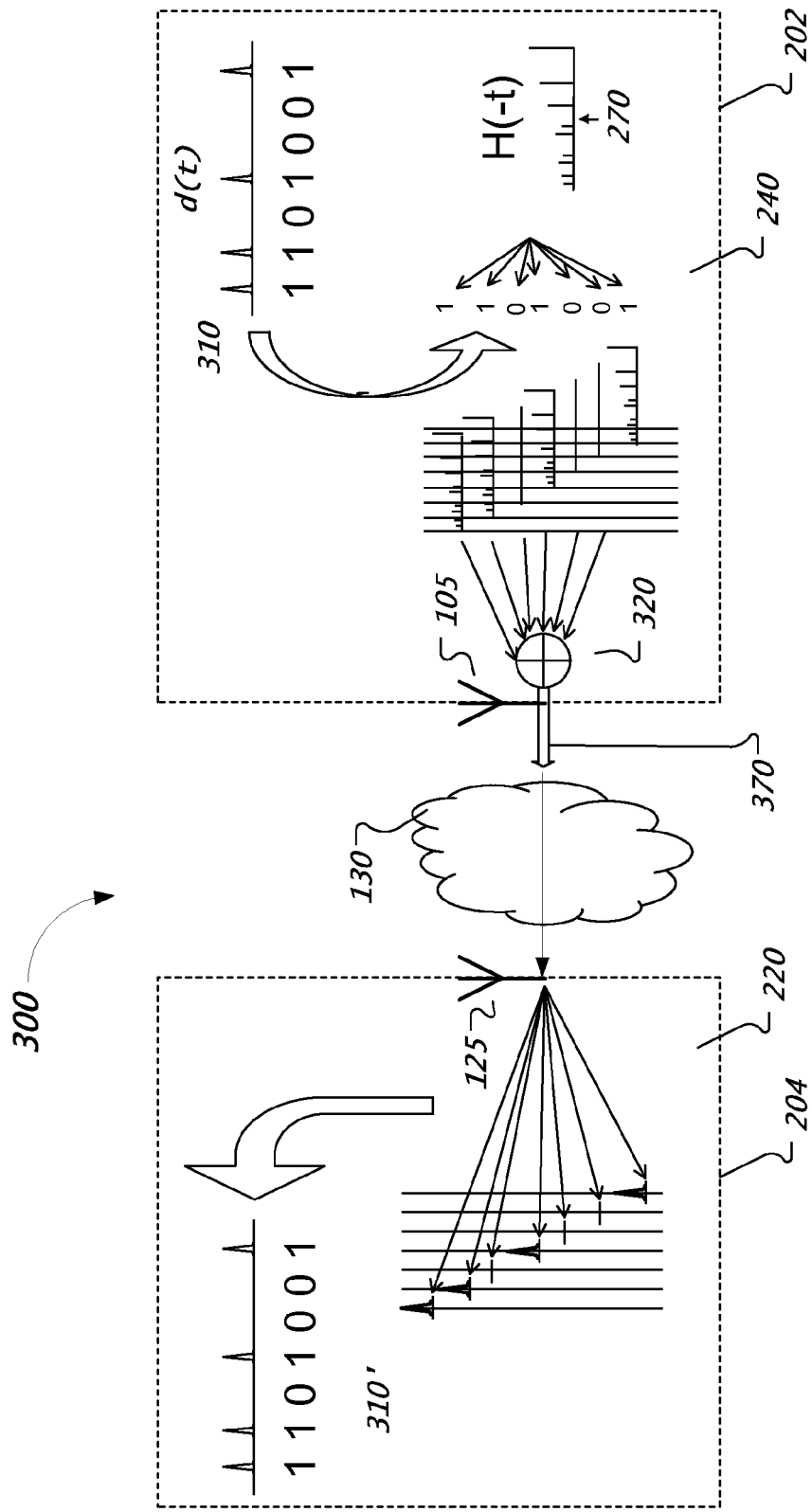
FIG. 3 is a schematic illustrating data transmission between a base and a target.

FIG. 3 depicts a procedure to integrate the time reversed channel impulse response waveform h(T−t) 270 into the data channel. A data stream d(t) 310 of sequential RF pulses can be sent from the base 202 to the target 204. In the illustrated example, the data stream d(t) 310 represents a digit sequence of 1101001. The data stream d(t) 310 destined for the target 204 is convolved with the time reversed channel impulse response h(T−t) 270. The time reversed channel impulse response h(T−t) 270 has been stored at the base 202 inside the waveform processing unit 250. The base-TX 240 transmits a copy of the time reversed channel impulse response h(T−t) 270 for each data bit, as shown in FIG. 3. In an exemplary implementation, a one-bit signal can be encoded and generated by emission of a copy of the time reversed channel impulse response h(T−t) 270 and a zero-bit signal can be generated when no copy of time reversed channel impulse response h(T−t) 270 at all is sent back, such that there are no waves to align when a zero returns to the target 204. In another implementation, a zero bit is encoded by emission of a modified copy of the time reversed channel impulse response h(T−t) 270.

Furthermore, ones and zeroes can be coded by different amplitude assignments. Ones and zeroes can also be coded by time, frequency, phase or scale modulation.

The temporal length of a bit can have various lengths, depending on the nature of the communications application. For example, for radio frequency (RF) data rates on the order of one gigabit per second, each bit may be on the order of 1 ns in the time domain. The temporal length of the channel impulse response h(t) for an RF wireless communications system characterized by multipath scattering or reflections varies depending on the configuration of the physical environment. For example, the time duration of h(t) can be on the order of 200 ns or more in some system implementations. The sampling frequency for the base and target may be two times the maximum frequency of the pulse response s(t)*h(t). For a 1-nsec impulse and a 1000-nsec channel impulse response h(t), the sampling frequency would typically be set at 2 GS/s resulting in a total of 2000 samples. The base-TX 240 can transmit all or part of the time reversed channel impulse response h(T−t) 270. In certain implementations, the base-TX 240 can modify the time reversed channel impulse response h(T−t) 270, by using digital signal processing (DSP) techniques, prior to transmission to the target 204.

Copies of time reversed channel impulse response h(T−t) 270 are time-multiplexed 320 in a prepared data stream signal based on an appropriate bit boundary synchronization, as illustrated in FIG. 3. Because the time reversed channel impulse response h(T−t) 270 is longer than the time between bits, the multiple delayed copies of the time reversed channel impulse response h(T−t) 270 are added before the transmission. In one implementation, the summation is performed digitally before the signal reaches analog circuitry of the base-TX 240. In another implementation, the summation is performed by analog circuitry of the base-TX 240.

The data stream signal starts at the base 202 as an output signal 370, prepared as described above, traverses the multipath transmission channel 130 and arrives at the target 204 as a stream of bits 310' corresponding to s(t), for example, 1101001. The respective copy of time reversed channel impulse response h(T−t) 270 corresponding to each bit at the base 202 has been matched and filtered during propagation through the medium 130 from the base 202 to the target 204, as described by EQs. 2 and 3. The target-RX 220 detects the data stream signal s(t) 310', free of the inter-symbol interference caused by the multipath transmission channel 130.

Figure 4:
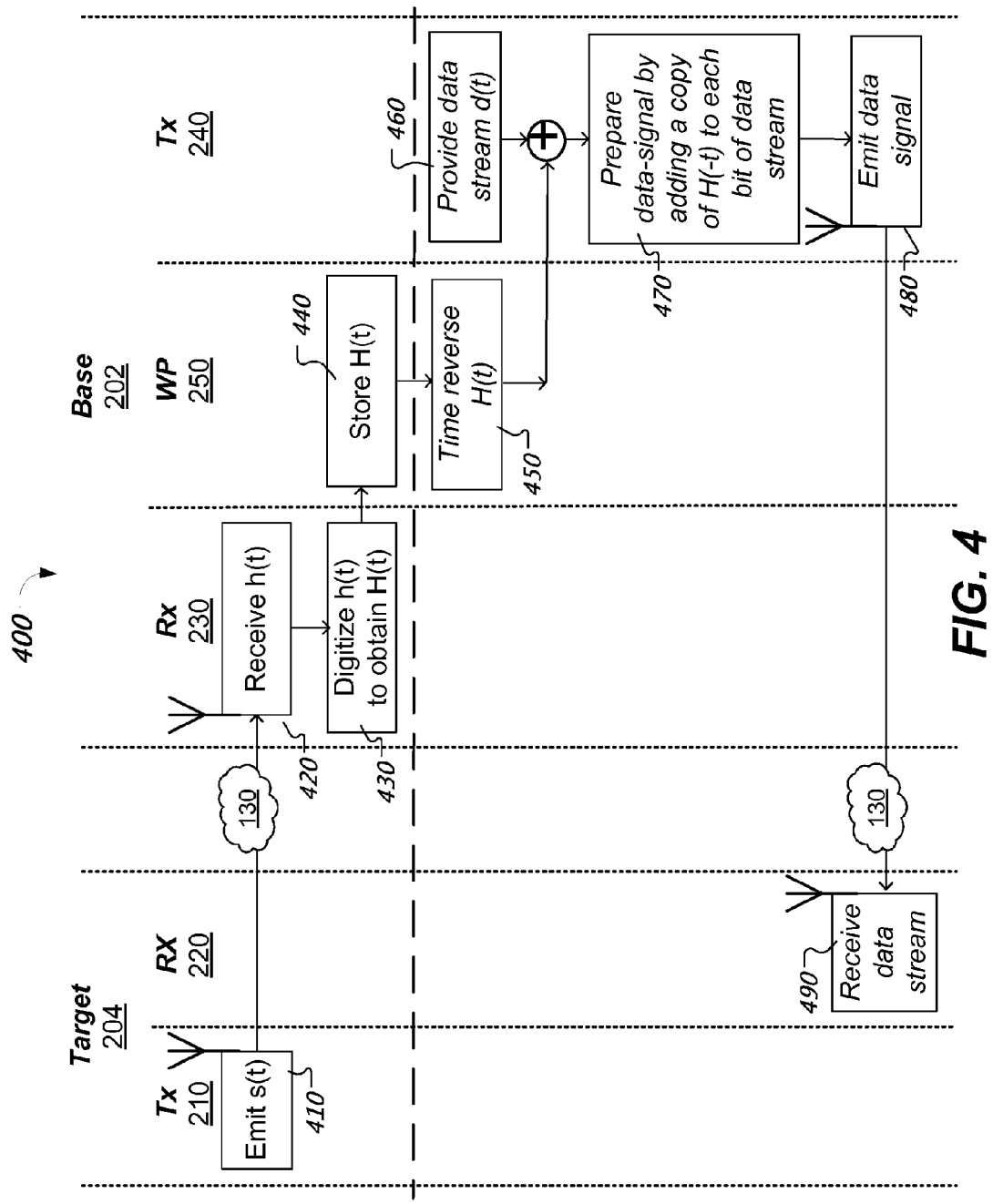
FIG. 4 is a method for data transmission between a base and a target.

FIG. 4 is a swim-lane diagram 400 illustrating a communication technique based on time-reversal with respect to FIGS. 2 and 3. The method 400 is depicted as a time sequence, with method steps performed earlier in time disposed at the top of diagram 400, and respectively method steps performed later in time disposed at the bottom of diagram 400.

The first or left-most (vertical) lane signifies the time sequence corresponding to the target-TX 210. The second lane corresponds to the time sequence of the target-RX 220. Thus, the first and second lanes depict method steps performed at the target 204 location.

The third lane represents the communication channel 130. Notably, signals are being transmitted through the communication channel, for example between steps 410 and 420, or between steps 480 and 490.

The fourth lane illustrates the time sequence of the base-Rx 230. The fifth lane corresponds to the time sequence of the base waveform-processor 250. The sixth or right-most lane represents the time sequence of the base-Tx 240. Thus, the fourth through sixth lanes depict method steps performed at the base 202 location.

At step 410, the target-Tx emits an impulse-pulse, s(t), using an omnidirectional antenna or another suitable antenna.

At step 420, the base-Rx 230 receives the channel impulse response, h(t), defined as a set of copies of the impulse-pulse, s(t), each copy of the impulse-pulse, s(t), emitted by the target-Tx 210 arriving at the base-Rx 230 at a different time in accordance to a length of a respective multi scattering path traveled by the respective copy of the impulse-pulse, s(t), through the transmission channel between the target and the base.

At step 430, the base-Rx digitizes the received channel impulse response, h(t), to obtain a channel impulse response waveform, H(t). An analog-to-digital converter (ADC, or simply digitizer) may be used to perform step 430. Intermediate steps between receiving the channel impulse response h(t) at step 420, and obtaining the channel impulse response waveform H(t) at step 430, will be described in a later section of this application, in reference to FIGS. 8-10. The channel impulse response waveform H(t) obtained at step 430 includes a set of digital samples as described above in reference to FIG. 2.

At step 440, the channel impulse response waveform H(t) is stored by the base waveform-processor 250. Several storage implementations have been described with respect to FIG. 2.

Returning to FIG. 4, the horizontal dashed-line succeeding step 440 represents a delineation between method steps related to obtaining the channel impulse response h(t) of the communication channel between the target and the base (as illustrated in FIG. 2), and method steps related to using the obtained channel impulse response h(t) to pre-code data streams for transmission from the base to the target (as illustrated in FIG. 3).

At step 450, the stored channel impulse response waveform H(t) is reversed in time domain. For example, to obtain the time reversed channel impulse response waveform H(−t), the channel impulse response waveform H(t) can be simply read and sorted in the reverse temporal order.

At step 460, a data stream is provided at the base-Tx for transmission to the target 204. The data stream can be generated locally at the base and can include instructions destined for the target. The data stream can also arrive at the base (if the base functions as a gateway) from the internet, and be destined for the target.

At step 470, the base-TX prepares a data-signal which includes a copy of the time reversed channel impulse response waveform H(−t) for each bit of the data stream. For example, if the data stream provided at step 460 is given by the bit-sequence d(t)=[1101001], then the data-signal prepared at step 470 is $$S(t) = H(-t) + H(-t+\Delta t) + H(-t+3\Delta t) + H(-t+ \quad (4)$$

In Eq. (4), Δt (e.g., 1 ns) represents the time duration of a bit of the data stream d(t). In this exemplary implementation of method 400, a copy of H(−t) is included in the data-signal for each 1-bit, and no copy of H(−t) is included for each 0-bit.

Therefore, the first term in Eq. (4) corresponds to the first bit in d(t). The second term in Eq. (4), H(−t+Δt), corresponds to the second bit in d(t), delayed from the first bit by Δt. The third term in Eq. (4), H(−t+3Δt), corresponds to the fourth bit in d(t), delayed from the first bit by 3Δt. And, the fourth term in Eq. (4), H(−t+6Δt), corresponds to the seventh bit in d(t), delayed from the first bit by 6Δt.

In step 480, the prepared and pre-coded data-signal is emitted by the base-TX 240 to the target 490. According to the data-signal preparation step discussed in reference to Eq. (4), H(−t) can be substituted, for example, with the time reversed channel impulse response waveform H(−t) 270 illustrated in FIG. 3. Specifically, H(−t) 270 includes 9 copies of the impulse-pulse 260, s(t), emitted by the target-Tx 210. Therefore, the emitted signal (prepared data-signal) S(t) contains 36 copies of the impulse-pulse 260, s(t), delayed in time in accordance to Eq. (4).

In step 490, the target-RX 220 receives the data stream d(t), provided earlier by the base 202, at step 460. Referring again to the exemplary data signal prepared according to Eq. (4), where H(−t) 270 is given in FIG. 3, the 9 copies of H(−t) 270 (corresponding to the first term in Eq. (4)) converge at the target-RX 220 simultaneously, to form one pulse corresponding to a 1-bit, as the first bit of a detected data stream: d'(t)=[1]. The next 9 copies of H(−t+Δt) 270 (corresponding to the second term in Eq. (4)) converge at the target-RX 220 simultaneously, delayed by a time interval Δt relative to the first pulse, to form one pulse corresponding to the next 1-bit, as the second bit of the detected data stream: d'(t+Δt)=[11]. The next 9 copies of H(−t+3Δt) 270 (corresponding to the third term in Eq. (4)) converge at the target-RX 220 simultaneously, delayed by a time interval 3Δt relative to the first pulse, to form one pulse corresponding to the next 1-bit, as the fourth bit of the detected data stream: d'(t+3Δt)=[11101]. And, the next 9 copies of H(−t+6Δt) 270 corresponding to the fourth term in Eq. (4) converge at the target-RX 220 simultaneously, delayed by a time interval 6Δt relative to the first pulse, to form one pulse corresponding to the next 1-bit, as the seventh (and last) bit of the detected data stream: d'(t+6Δt)= [1101001].

Therefore, method steps 450 to 490 enable transmission of a data stream d(t) provided at a base and destined for a target, by pre-coding each bit of the data stream with a copy of the time reversed channel impulse response waveform H(−t), corresponding to the transmission channel between the target and the base.

Radial Positioning of Non-Cooperative Remote Target

In the communication method 400 described above, the remote target 204 is a cooperative remote target that is configured to emit an impulse-pulse as a probe pulse, s(t), so that the central base 202 can use this probe pulse to acquire or map the channel impulse response h(t) of the communication channel between the target and the base.

There exist situations when the base may need to locate or identify the presence of one or more non-cooperative targets which do not emit an impulse pulse. For example, an RF receiver without a transmitter can be a non-cooperative target. There are also situations where it is desirable to have one or more central high performance communication nodes communicating with a set of lower performing nodes which may be mobile in one instance, and which may not be capable of performing all the functions described earlier. For example, a target, may send data through a severe multipath environment to the base but does not have the capability to derive the channel impulse response by itself and to perform the time reversal operation on the response. In this case it may be desirable for a higher performance base station, for example, the base 202, to enable target node to send the correct time reversed signal to the base 202.

Figure 5:
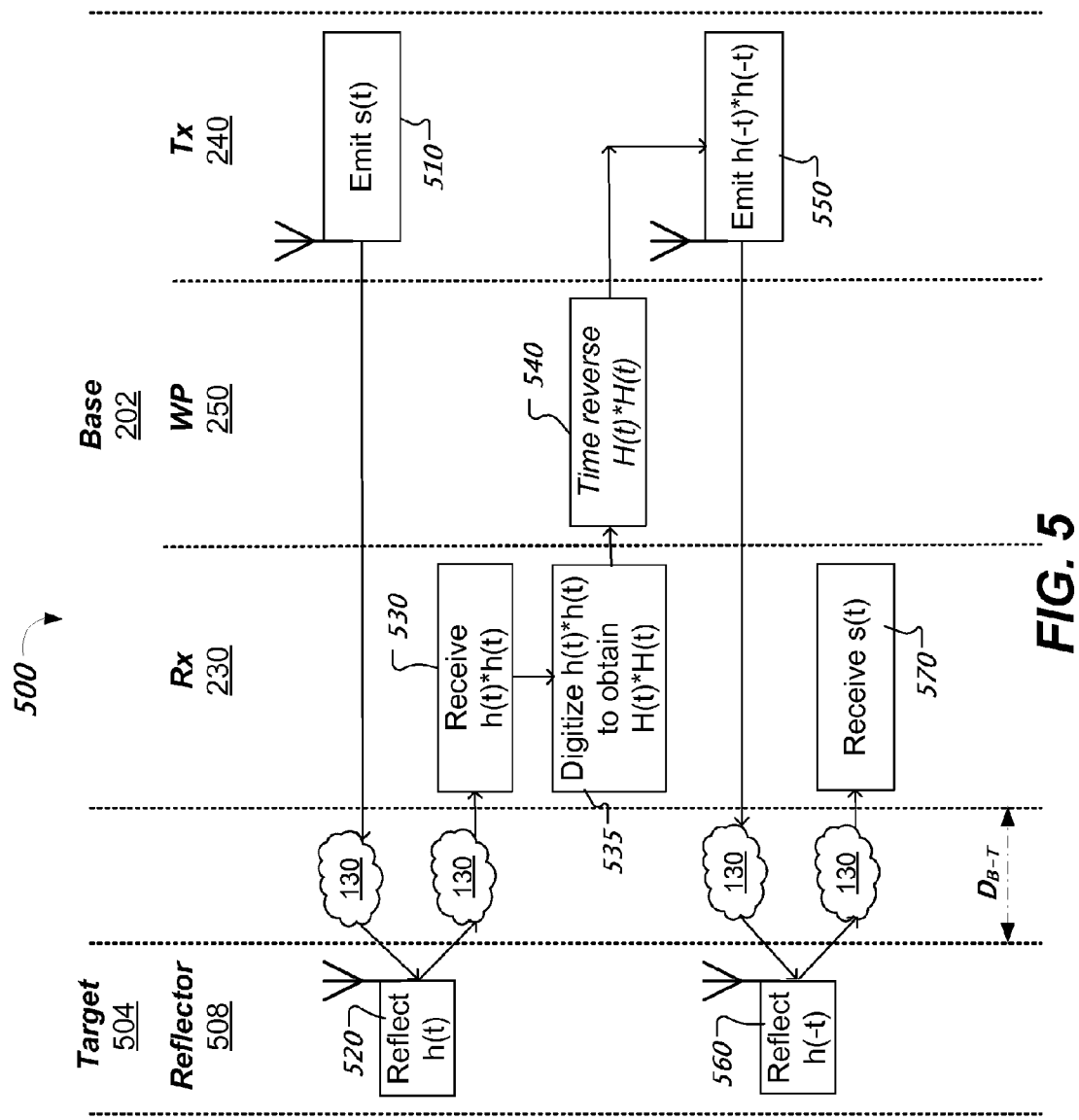
FIG. 5 is a method for target identification by a base.

FIG. 5 shows a swim-lane diagram 500 illustrating a communication technique, based on time-reversal that enables a base 202 to locate a non-cooperative target 504 and to determine a radial distance to the non-cooperative target 504. The method 500 is depicted as a time sequence, with method steps performed earlier in time disposed at the top of diagram 500, and respectively method steps performed later in time disposed at the bottom of diagram 500.

The first or left-most (vertical) lane signifies the time sequence corresponding to the target reflector 508. Notably, signals reflect off the target reflector, for example at steps 520 and 560. Thus, the first lane depicts events that occur at the target 504 location.

The second lane represents the communication channel 130. Notably, signals are being transmitted through the communication channel, for example between any of the steps 510 and 520, steps 520 and 530, steps 550 and 560, and steps 560 and 570.

The third lane illustrates the time sequence of the base-Rx 230. The fourth lane corresponds to the time sequence of the base waveform-processor 250. The fifth or right-most lane represents the time sequence of the base-Tx 240. Thus, the third through fifth lanes depict method steps performed at the base 202 location.

At step 510, the base-Tx 240 emits an impulse-pulse, s(t), using an omnidirectional antenna or another suitable antenna.

At step 520, a set of copies of the impulse-pulse, s(t), reaches a reflector 520 of a non-cooperative remote target 504. Each copy of the impulse-pulse, s(t), emitted by the base-Tx 240 arrives at the reflector 520 of the non-cooperative remote target 504 at a different time in accordance to a length of a respective multi scattering path traveled by the respective copy of the impulse-pulse, s(t), through the transmission channel between the base and the non-cooperative remote target. The foregoing set of the impulse-pulse, s(t), defines a channel impulse response, h(t), corresponding to the transmission channel between the base and the non-cooperative remote target.

The channel impulse response, h(t), reflects off the reflector 520 of the non-cooperative remote target 504. The foregoing reflection event 520 is equivalent to the target 504 emitting the channel impulse response, h(t), back into the transmission channel 130, using an omnidirectional antenna.

At step 530, the base-Rx 230 uses its antenna to receive a copy of the channel impulse response, h(t), for each of the copies of the impulse-pulse, s(t), included in the channel impulse response h(t) reflected by the target at step 520. For example, for a reflected channel impulse response h(t) containing N copies of the impulse-pulse s(t), the base-Rx 230 receives N×N copies of the impulse-pulse s(t). Equivalently, at step 530, the base-Rx 230 receives the convolution of the channel impulse response with itself, h(t)*h(t).

At step 535, the base-Rx 230 digitizes the received self-convolved channel impulse response, h(t)*h(t), to obtain a self-convolved channel impulse response waveform, H(t)*H(t). The self-convolved channel impulse response waveform H(t)*H(t) obtained at step 535 includes a set of digital samples, as described above with respect to FIG. 2.

At step 540, the waveform processor 250 in the base 202 processes the self-convolved channel impulse response waveform H(t)*H(t) to produce the time reversal waveform. As described in reference to method 400, the time reversal step may involve reading and sorting in the reverse temporal order the self-convolved channel impulse response waveform H(t)*H(t).

At step 550, the time reversed self-convolved channel impulse response waveform H(−t)*H(−t) is emitted by the base-Tx 240 to the target 504. The emission at step 550 may be performed using an omnidirectional antenna or another suitable antenna.

At step 560, the set of pulses returning to the reflector 508 of the non-cooperative remote target 504 in this fashion forms the time reversed channel impulse response h(−t). Equivalently, according to EQ. (3), the transmission channel 130 "filters out" (or "de-convolves") h(−t) from the emitted time reversed self-convolved channel impulse response h(−t)*h(−t):

$$q(t)=[h(-t)*h(-t)]*h(t)$$

$$q(t)=h(-t)*[h(-t)*h(t)]=h(-t)*s(t)=h(-t) \quad (5)$$

In EQ (5), the signal q(t) that reaches the reflector 508 of the non-cooperative remote target 504 at step 560 represents the time reversed channel impulse response h(−t).

The copies of the impulse-pulse, s(t), that form the time reversed channel impulse response h(−t) reflect off the reflector 508 of the non-cooperative remote target 504 back into the transmission channel 130 and arrive at the base 202 simultaneously and in phase, to form a returning impulse-pulse, s(t). The reflection event 560 is equivalent to the target 504 emitting the time reversed channel impulse response h(−t) using an omnidirectional antenna or another suitable antenna.

At step 570, the base-Rx 230 receives the returning impulse-pulse, s(t). The time interval between the emission of the impulse-pulse (probe pulse) at step 510 and the receiving of the returning impulse-pulse at step 570 represents a time, T, corresponding to two round trips from the base 202 to the non-cooperative remote target 504. Thus, by measuring T and knowing the signal propagation speed, v, through the transmission channel 130, the radial distance from the base 202 to the non-cooperative remote target 504, $R_{BT}$, can be calculated to be $R_{BT}$=vT/4. Additional corrections can be applied by Base 202 for latency in various processes, e.g., time reversal or detection of the signal at step 540.

Since the base 202 receives a narrow pulse at step 570, this can be viewed as a clean signal being sent between target 504 and base 202, even though time reversal was not performed by target node 504 at step 560. In fact time reversal was performed in step 540 by base 202. Hence the base 202 has enabled a remote node, in this example target 504, to send a signal to base 202 that is immune to perturbations caused by severe multipath scattering.

Except for the last step 570, a characteristic of method 500 is that no steps or events are accompanied by power delivery (or equivalently, energy delivered through a signal that is tightly focused in time.) While the base identifies the presence of uncooperative remote targets in accordance to method 500, the signal power is maintained under a critical level to avoid excessive concentration of power at the base during step 570. In some implementations, it is of interest to deliver significant power to a remote location, either to supply power to a friendly remote target or to destroy an unfriendly remote target. In addition, the base station may be operated to send data from to a remote node which is uncooperative in the sense that it will not or cannot send out a pulse for the purposes of allowing the base station to acquire the channel impulse response and to create the time reversed version of that channel impulse response. Under this circumstance, uncooperative nodes are used to reflect some portion of energy incident on them. Remote power delivery from a base to a remote target or communication between a base and a remote uncooperative target can be achieved by focusing a high energy signal that is tightly focused in time at the remote target location. Methods and apparatus for remote power delivery are described in the following sections.

In some implementations, the target 504 may be configured to include a signal modulation mechanism to modulate data on the reflected signal to the base 202 and to send the reflected signal modulated with data to the base 202. Due to the time reversal property encoded in the signal emitted by the base 202 at the step 550, the reflected signal modulated with data will self correct distortions and interferences caused by the transmission channel through the medium 130 at the base 202. As such, the modulated data sent by the target 504 can be extracted at the base 202 with high data fidelity.

Base Delivers Power to Non-Cooperative Remote Target

Figure 6A:
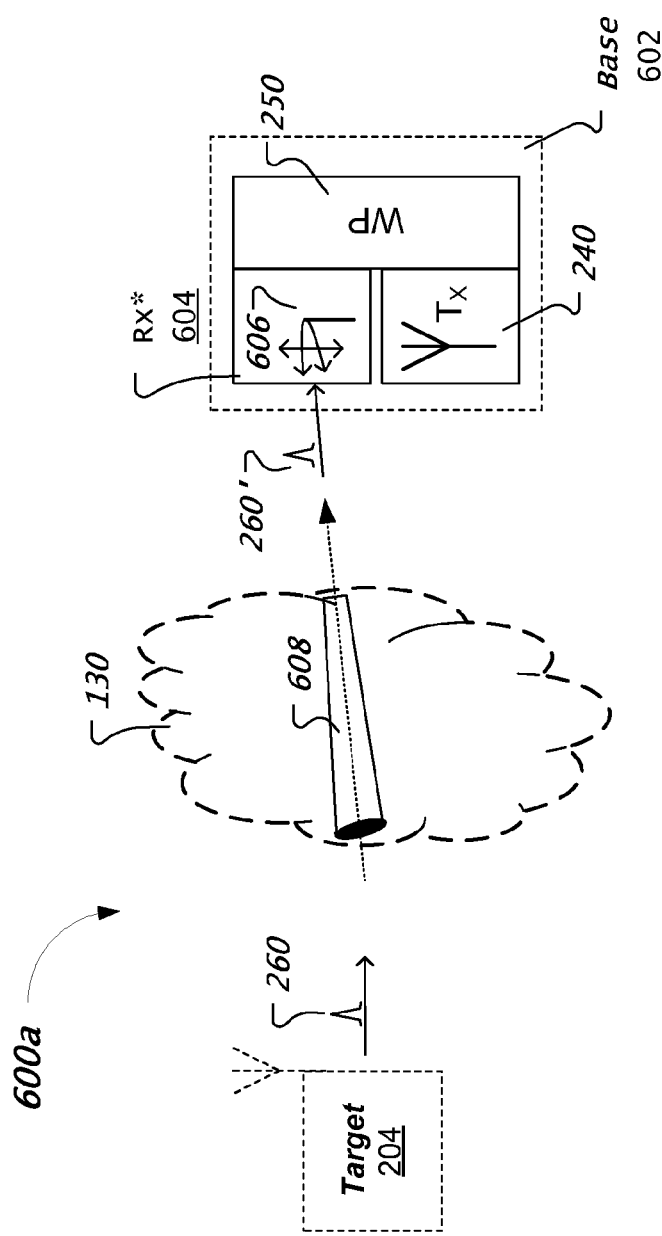
FIG. 6(a) is schematic illustrating components of a base for acquiring an impulse response corresponding to a communication channel between a target and the base.
Figure 6B:
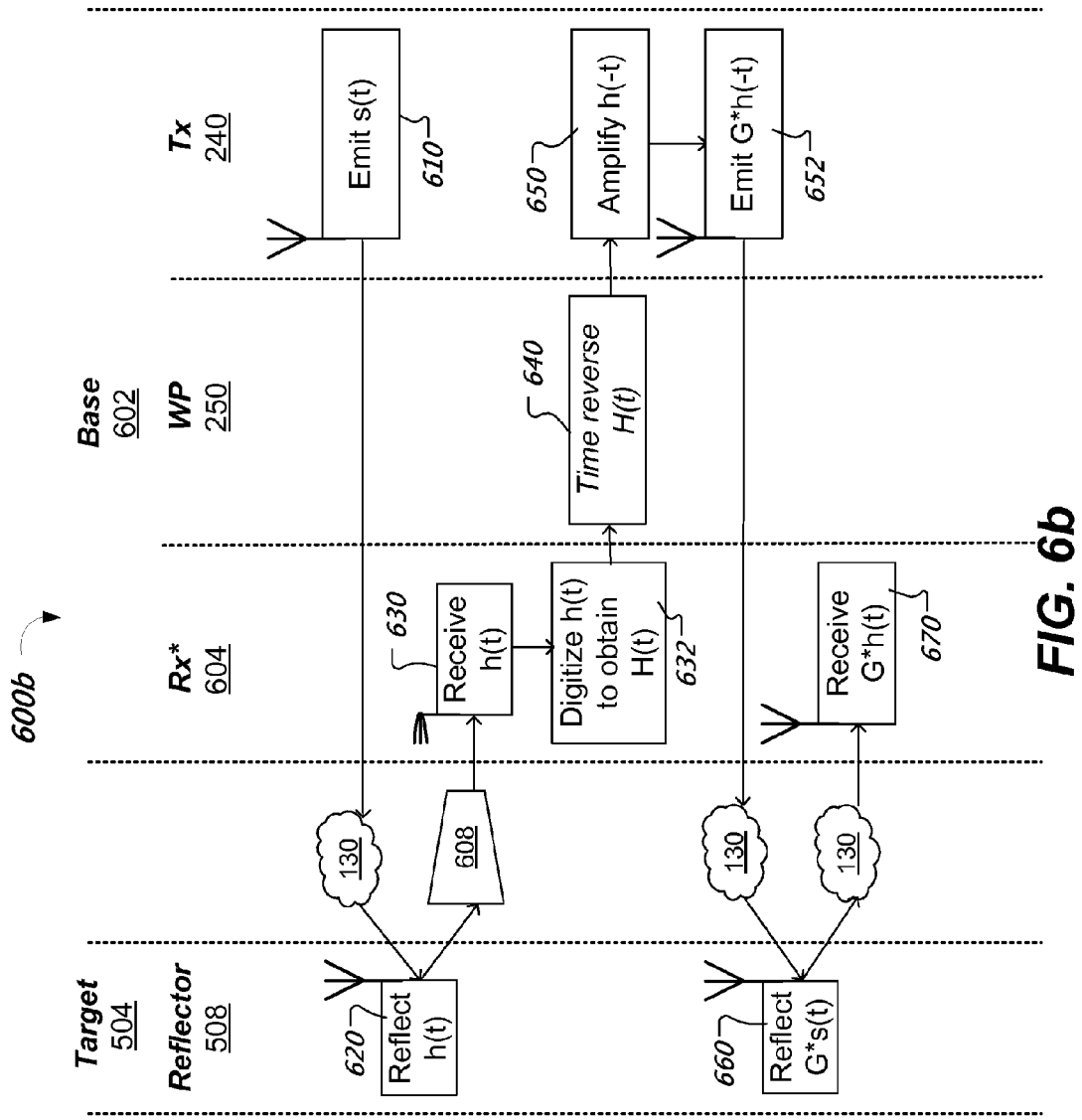
FIG. 6(b) is a method for power transmission from a base to a target.
Figure 7:
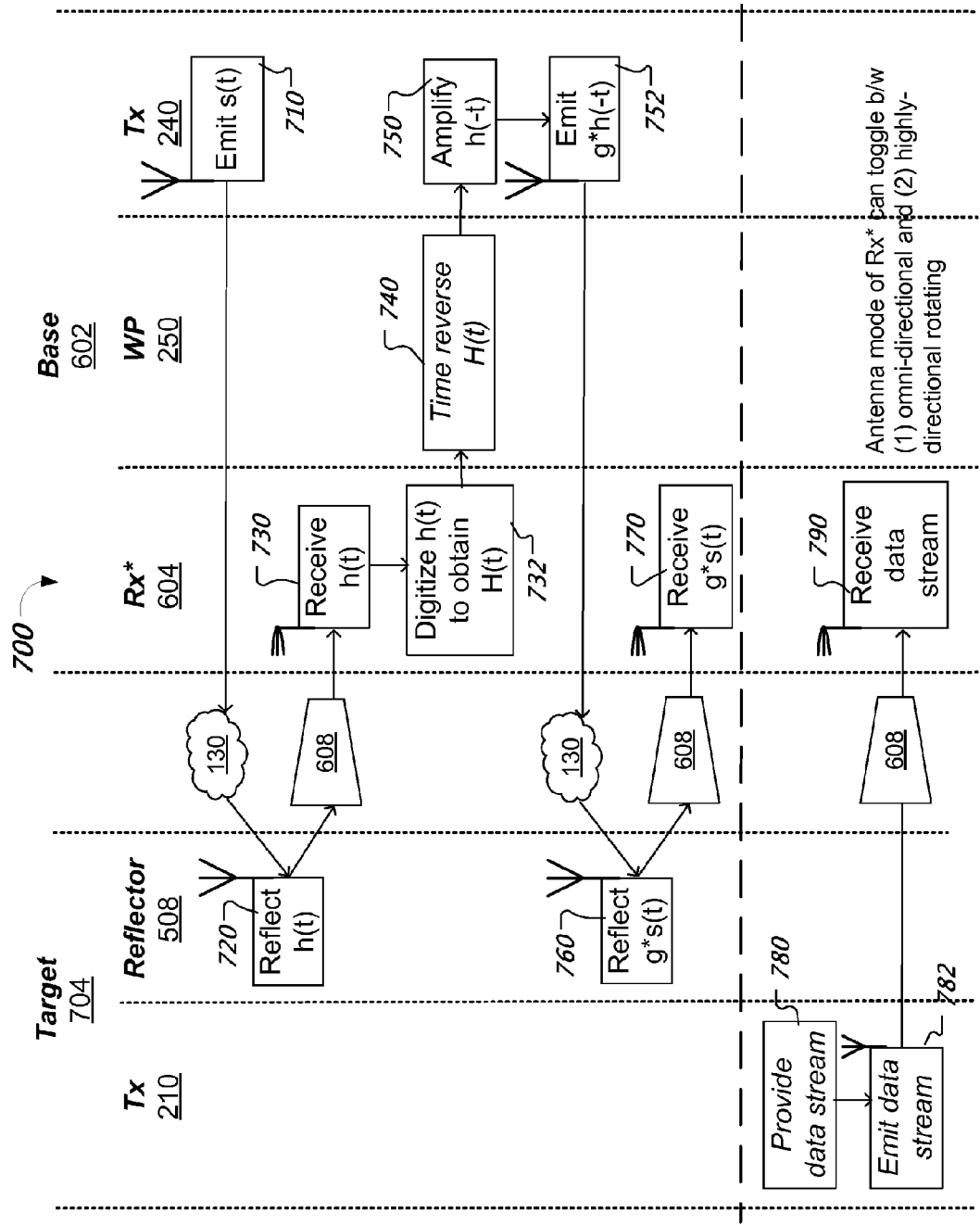
FIG. 7 is a method for data transmission between a target and a base.

In the time reversal technique used in the example in FIG. 5, the time reversal operation is performed at step 540 by the base 202 on the signal that passes through the transmission channel 130 twice by going from the base 202 to the target 504 and back to the base 202. As such, the time reversed signal sent out at the step 550 by the base transmitter 240 is distorted due to multipath and other effects when it first reaches the target 504 at the step 560 and will self correct when the signal reflected by the target 504 arrives at the base 202 at step 570. Alternatively, the time reversal waveform can be configured to correct the distortions caused by a single pass through the medium 130 so that a time reversed signal emitted by the base 202 is self corrected when it reaches the target 504. FIGS. 6a, 6b and 7 provide examples of the latter time reversal implementation for various applications, including delivering power from the base to the target and other communication operations.

All signal emissions and detections occurring at the target 204 or base 202 previously described in this application can be performed using an omnidirectional antenna or another suitable antenna. In the current section, the antenna used by the base-RX is configured to operate in either (i) omnidirectional mode or (ii) narrow field-of-view (FOV) mode (directional mode). When the base-RX antenna operates in the narrow FOV mode, the base-RX antenna acquires signals within a narrow solid-angle defined by an antenna aperture and antenna-element (hardware and software) configuration. Furthermore, the narrow solid-angle can be oriented at a desired direction given by 3-D angular coordinates, $(\theta, \phi)$. The origin of the coordinate system is located at the base-RX antenna. Additionally, because the 3-D angular orientation of the base-RX antenna can be adjusted, the directional mode of the base-RX antenna is also referred to as a scanning mode. "Narrow" in this context means that the antenna at the base station accepts energy along the line of sight path connecting the base and target and excluding energy approaching the antenna from other directions. In practice the solid angle need only be narrow enough such that it substantially excludes multipath energy arriving at the base from any signal emitted by the target. In the case where no line-of-sight path exists, and the energy passes between target and base by means of reflecting from scatterers or reflecting from reflectors, a narrow FOV implies that the FOV is narrow enough to eliminate returns from all but one scattering path.

FIG. 6a illustrates a base 602 including a base-Rx 604, a base-Tx-240 and waveform processor 250. In this example, the antenna used for transmission by base-TX-240 operates in the omnidirectional mode. The base-Rx antenna 606 can function in either (i) omnidirectional mode or (ii) narrow FOV mode. In practical implementations, these antenna operations by the two separate antennas may be achieved by a dual-mode antenna that is capable of operating in the two modes.

The base-Rx antenna 606 functioning in omnidirectional mode receives a set of copies of a probe-pulse 260 emitted by a target 204 that arrives at the base-Rx 604 from all scattering centers in the transmission medium 130 that reflect or scatter the respective copies of the probe-pulse 260 in the direction of the base-Rx 604, according to FIG. 2. Because such multi-scattering paths have different lengths, the copies of the probe-pulse 260 arrive at respectively different times to form a channel impulse response h(t).

In contrast to the omnidirectional mode, the base-Rx antenna 606 operating in narrow FOV mode receives ("sees") only one copy 260' of the probe-pulse 260 emitted by the target 204 that arrives at the base-Rx 604 along one path contained within the narrow solid angle representing the antenna's FOV. This one path may be along the line-of-sight if the base-RX antenna operating in narrow-FOV is oriented directly towards the target. Alternatively, the one path may also be along an arbitrary direction that connects the base to one scattering center. Therefore, no additional multipass scattering is captured by the base-Rx antenna 606 operating in narrow FOV mode, such that only one copy 260' of the probe-pulse 206 emitted by the target 204 is received by the base-RX 604.

Therefore, when the base-RX antenna 606 operates in the omnidirectional mode, the communication channel 130 between the base and the target is essentially the entire free space, including multiple scattering centers. The copies of the probe-pulse 206 emitted by the target 204 arrive at the base-RX 604, at respectively different times according to the length of the multi scattering paths, to form a non-trivial channel impulse response: $h(t) \neq 1$.

When the base-RX antenna 606 operates in the narrow FOV mode, the communication channel 608 between the base and the target includes essentially a narrow path contained within the solid-angle subtended by the base-RX antenna 606 operating in narrow FOV, containing no more than one scattering center. Therefore, the channel impulse response is (approximately) unity, $h(t)\_1$. Method 500 described in the previous section is modified below, and implemented in a communication system 600 including a base 602 equipped with a base-RX 604 including an antenna 606 configured to operate in either omnidirectional mode or narrow FOV mode.

FIG. 6b shows a swim-lane diagram 600b illustrating an example of a communication technique based on time-reversal, for delivering power from a base 202 to a non-cooperative remote target 504. Method 600b is depicted as a time sequence, with method steps performed earlier in time disposed at the top of diagram 600b, and respectively method steps performed later in time disposed at the bottom of diagram 600b.

The first or left-most (vertical) lane signifies the event sequence corresponding to the target reflector 508. Notably, signals reflect off the target reflector, for example at steps 620 and 660. Thus, the first lane depicts events that occur at the target 504 location.

The second lane illustrates communication channels between the base and target. Notably, signals are being transmitted through a multi-scattering communication channel 130, for example between any of the steps 510 and 620, steps 652 and 660, and steps 660 and 670. Additionally, signals are also being transmitted through a scattering-free communication channel 608, for example between any of the steps 620 and 630.

The third lane illustrates the time sequence of the base-Rx 604. The fourth lane corresponds to the time sequence of the base waveform-processor 250. The fifth or right-most lane represents the time sequence of the base-Tx 240. Thus, the third through fifth lanes depict method steps performed at the base 602 location.

At step 610, the base-Tx 240 emits a probe-pulse, s(t), using an omnidirectional antenna.

At step 620, a set of copies of the probe-pulse, s (t), reaches a reflector 520 of a non-cooperative remote target 504. Each copy of the probe-pulse, s (t), emitted by the base-Tx 240 arrives at the reflector 520 of the non-cooperative remote target 504 at a different time in accordance to a length of a respective multi scattering path traveled by the respective copy of the probe-pulse, s (t), through the transmission channel between the base and the non-cooperative remote target. The foregoing set of copies of the probe-pulse, s (t), defines a channel impulse response, h(t), corresponding to the transmission channel between the base and the non-cooperative remote target.

The channel impulse response, h(t), reflects off the reflector 508 of the non-cooperative remote target 504. The foregoing reflection event 620 is equivalent to the target 504 emitting the channel impulse response, h(t), back into the transmission channel 130, using an omnidirectional antenna.

At step 630, the base-Rx 230, operating the base-Rx antenna in narrow FOV mode, receives a copy of the channel impulse response, h(t). Equivalently, each of the copies of the impulse-pulse, s (t), included in the channel impulse response h(t) reflected by the target at step 620 arrives at the base-Rx antenna operated in narrow FOV mode without undergoing multiple scatterings.

At step 632, the base-Rx 230 digitizes the received channel impulse response, h(t), to obtain a channel impulse response waveform, H(t). The channel impulse response waveform H(t) obtained at step 632 includes a set of digital samples, as described above with respect to FIG. 2.

At step 640, the channel impulse response waveform H(t) is reversed in time domain. As described in reference to method 400 or 500, the time reversal step may involve simply reading (sorting) in reverse temporal order the channel impulse response waveform H(t).

At step 650, the base-Tx 240 amplifies the time reversed channel impulse response h(−t) to obtain Gh(−t). The amplification factor G may be larger than 1.

At step 652, the amplified time reversed channel impulse response waveform Gh(−t) is emitted by the base-Tx 240 to the target 504. The emission at step 652 is performed using an omnidirectional antenna.

At step 660, the copies of the probe-pulse s (t) that form the amplified time reversed channel impulse response Gh(−t) arrive at the target 504 simultaneously and in phase, to form an amplified probe-pulse, G s (t). In an exemplary implementation, if the non-cooperating remote target is also known to be unfriendly, then the amplification level is set very high, 1<<G, and the large signal power (high energy focused in a short time) delivered by the arriving amplified probe-pulse, Gs(t), can blast the unfriendly remote target. Accordingly, method 600b may be used to destroy improvised explosive devices (IED) in urban combat situations.

The amplified probe-pulse, G s(t), delivered at the remote target 504, is also reflected by the remote target reflector 508. The reflection event 640 is equivalent to the target 504 emitting the amplified probe-pulse, G s(t), using an omnidirectional antenna.

At step 670, in response to backscatter of the amplified probe-pulse Gs(t) that occurred at previous step 660, a set of copies of the amplified probe-pulse, Gs(t), reaches the base-Rx 604 due to the multi scattering nature of the transmission medium 130. The base-RX antenna operating in omnidirectional mode (as opposed to operating in narrow FOV mode during the earlier step 610) detects the entire set of copies of the amplified probe-pulse, effectively acquiring an amplified channel impulse response Gh(t). However, the returning signal energy is spread over the long duration of the amplified channel impulse response Gh(t), reducing the effective power seen by the base. Thus, the base 602 that has delivered very large power to the remote target cannot be damaged (self-destroyed) by the backscattered detected signal Gh(t).

If the amplification level at step 650 is less pronounced, i.e., G~1, then the base-Rx can continue to operate it's antenna in narrow FOV mode, and effectively detect the returning probe-pulse reflected by the target 508. Additionally, for such an implementation, the base may establish full duplex communication with the remote target, as described in the following section.

Base Delivers Power to Target which Sends Data to Base

Once a base 602 confirms the presence of a cooperative remote target 704, e.g., according to method 500, the base 602 may signal the cooperative remote target 704 to start transmitting data.

FIG. 7 shows a swim-lane diagram 700 illustrating an example of a communication method 700 for delivering data from the cooperative remote target 704 to the base 602. The remote target 704 that participates in communication method 700 can have less signaling functionality than the base 602.

The method 700 is depicted as a time sequence, with method steps performed earlier in time disposed at the top of diagram 700, and respectively method steps performed later in time disposed at the bottom of diagram 700.

The first or left-most (vertical) lane signifies the time sequence corresponding to the target transmitter 210. The second lane illustrates the time sequence corresponding to the target reflector 508. Notably, signals reflect off the target reflector, for example at steps 720 and 760. Thus, the first and second lanes depict events that occur at the target 704 location.

The third lane illustrates communication channels between the base and target. Notably, signals are being transmitted through a multi-scattering communication channel 130, for example between any of the steps 710 and 720, and steps 752 and 760. Additionally, signals are also being transmitted through a scattering-free communication channel 608, for example between any of the steps 720 and 730, steps 760 and 770, and steps 782 and 790.

The fourth lane illustrates the time sequence of the base-Rx 604. The fifth lane corresponds to the time sequence of the base waveform-processor 250. The sixth or right-most lane represents the time sequence of the base-Tx 240. Thus, the fourth through sixth lanes depict method steps performed at the base 602 location.

At step 710, the base-Tx 240 emits a probe-pulse, s(t), using an omnidirectional antenna.

At step 720, a set of copies of the probe-pulse, s(t), reaches a reflector 508 of a cooperative remote target 704. Each copy of the probe-pulse, s(t), emitted by the base-Tx 240 arrives at the reflector 508 of the cooperative remote target 704 at a different time in accordance to a length of a respective multi scattering path traveled by the respective copy of the probe-pulse, s(t), through the transmission channel between the base and the cooperative remote target. The foregoing set of copies of the probe-pulse, s(t), defines a channel impulse response, h(t), corresponding to the transmission channel between the base and the cooperative remote target.

The channel impulse response, h(t), reflects off the reflector 508 of the cooperative remote target 704. The foregoing reflection event 720 is equivalent to the target 704 emitting the channel impulse response, h(t), back into the transmission channel 130, using an omnidirectional antenna.

At step 730, the base-Rx 230 operating the base-Rx antenna in narrow FOV mode receives a copy of the channel impulse response, h(t). Equivalently, each of the copies of the impulse-pulse, s(t), included in the channel impulse response h(t) reflected by the target at step 720 arrives at the base-Rx antenna operated in narrow FOV mode without undergoing multiple scatterings.

At step 732, the base-Rx 230 digitizes the received channel impulse response, h(t), to obtain a channel impulse response waveform, H(t). The channel impulse response waveform H(t) obtained at step 732 includes a set of digital samples, as described above with respect to FIG. 2.

At step 740, the channel impulse response waveform H(t) is reversed in time domain. As described in reference to method 400, 500 or 600b, the time reversal step may involve reading and sorting in reverse temporal order the channel impulse response waveform H(t).

At step 750, the base-Tx 240 amplifies the time reversed channel impulse response h(−t) to obtain gh(−t). The amplification factor g is larger than 1, e.g., $1 \leq g$.

At step 752, the amplified time reversed channel impulse response waveform gh(−t) is emitted by the base-Tx 240 to the target 704. The emission at step 752 is performed using an omnidirectional antenna.

At step 760, the copies of the probe-pulse, s(t) that form the amplified time reversed channel impulse response gh(−t) arrive at the target 704 simultaneously and in phase, to form an amplified probe-pulse, gs(t). In an exemplary implementation, the cooperative remote target 704 may be waiting for (expecting) such a probe-pulse from the base 602. Receiving the amplified probe-pulse gs(t) at step 760, may signify for the cooperative remote target 704 permission to start data transmission to the base 602.

The amplified probe-pulse, gσ(t), delivered at the remote target 504, is also reflected by the remote target reflector 508. The reflection event 760 is equivalent to the target 704 re-emitting the amplified probe-pulse, gs(t), using an omnidirectional antenna.

At step 770, in response to backscatter of the amplified probe-pulse gs(t) that occurs at previous step 760, a copy of the amplified probe-pulse, gs(t), reaches the base-Rx 604 operating its antenna in narrow FOV mode. In fact, the base-Rx antenna continues to operate in the same narrow FOV mode as it does at earlier step 730. Moreover, the angular coordinates of the scanner antenna are locked at the value selected at step 730. Further, the angular coordinates of the scanner antenna may be assigned to the cooperative target 704, and stored at the base 602 together with the channel impulse response H(t) corresponding to the communication channel between the target 704 and base 602.

Additionally, receiving the amplified probe-pulse gs(t) at step 770, may alert the base 602 about the beginning of data transmission from the cooperative target 704.

The horizontal dashed-line succeeding step 780 represents a delineation between method steps related to identifying a cooperative remote target 704 by a base 602 and method steps related to transmitting data from the cooperative target 704 to the base 602.

At step 780, a data stream is provided at the target-Tx 210 for transmission to the base 602. The data stream can be generated locally at the target and can include instructions destined for the base. The data stream can also include replies to instructions received previously from the base.

At step 782, the provided data stream is emitted by the target-TX 210 to the base 602 using an omnidirectional antenna.

At step 790, the base-Rx 604, operating its antenna in narrow FOV mode, receives the data stream emitted by the remote cooperative target 704 at the previous step 782. The angular orientation of the base-Rx antenna is the same as in step 770 and optimized for receiving, the sequence of pulses (corresponding to data bits) included in the emitted data stream, from the remote cooperative target 704.

Full duplex communications based on time reversal encoding between a base and a cooperative remote target can be implemented using a combination of method 400 and method 700.

In the above technical description we refer to the impulse response being generated by a node emitting an "impulse." This is merely the simplest signal from which the impulse response can be derived. Other signals can be used, for example, a sequence of impulses optimized for recovery of the signals in noise or to enable noise to be averaged from the recovered impulse signal. Different shaped pulses may also be employed. The most likely variant of pulse shape is that the impulse is not technically a mathematical delta function but a pulse shaped by the transmit filter function and the emitting antenna which may differentiate the current fed to the antenna with respect to time. The only requirement is that the node which is responsible for time reversing the impulse response, knows what pulse shape or sequence was employed so that it can deconvolve the impulse response from the received signal.

Although a few variations have been described in detail above, other modifications are possible. For example, the logic flow depicted in the accompanying figures and described herein does not require the particular order shown, or sequential order, to achieve desirable results.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations, enhancements and other implementations can be made based on what is described and illustrated in this document.

What is claimed is:

1. A method for communications, comprising:
  at a base that transmits and receives communication signals,
    emitting an impulse-pulse s(t) in multiple directions;
    in response to emitting the impulse-pulse s(t), detecting at a first angular orientation and over a first solid-angle a channel impulse response, h(t), reflected from a remote target, wherein:
      the first angular orientation comprises first 3-D angular coordinates, (θ, φ), in a coordinate system with an origin at the base;
      the channel impulse response, h(t), comprises copies of the impulse-pulse s(t), each copy of the impulse-pulse s(t) provided to the remote target at a different time based on a length of a respective path traveled by the respective copy of the impulse-pulse s(t) through a communication channel between the base and the remote target;
reversing in time domain the channel impulse response h(t);
amplifying the time reversed channel impulse response h(−t);
transmitting in the multiple directions the amplified time reversed channel impulse response, Gh(−t); and
detecting from the multiple directions an amplified channel impulse response, Gh(t), based on residual portions of an amplified impulse-pulse Gs(t) reflected from the remote target, wherein the amplified impulse-pulse Gs(t) comprises copies of the impulse-pulses s(t) included in the transmitted amplified time reversed channel impulse response, Gh(−t) provided to the remote target at the same time.

2. The method of claim 1, wherein:
the base and the remote target are wireless radio frequency (RF) communication devices.

3. The method of claim 1, wherein:
controlling the amplifying of the time reversed channel impulse response at the base so that the amplified channel impulse response that reaches the remote target has an energy sufficiently high to cause a damage to the remote target.

4. The method of claim 1, wherein:
controlling the amplifying of the time reversed channel impulse response at the base so that the amplified channel impulse response that reaches the remote target has an energy sufficiently high to deliver power to the remote target.

5. A method for communications, comprising:
emitting an impulse-pulse s(t) in multiple directions;
in response to emitting the impulse-pulse s(t), detecting at a first angular orientation and over a first solid-angle a channel impulse response, h(t), reflected from a remote target, wherein:
  the first angular orientation comprises first 3-D angular coordinates, (θ, φ), in a coordinate system with an origin at the base;
  the channel impulse response, h(t), comprises copies of the impulse-pulse s(t), each copy of the impulse-pulse s(t) provided to the remote target at a different time based on a length of a respective path traveled by the respective copy of the impulse-pulse s(t) through a communication channel between the base and the remote target;
reversing in time domain the channel impulse response h(t);
amplifying the time reversed channel impulse response h(−t);
transmitting in multiple directions the amplified time reversed channel impulse response, gh(−t);
detecting at the first angular orientation and over the first solid-angle an amplified impulse-pulse, gs(t) reflected from the remote target, wherein the amplified impulse-pulse, gs(t) comprises copies of the impulse-pulses s(t) included in the transmitted amplified time reversed channel impulse response, gh(−t) provided to the remote target at the same time; and subsequently,
detecting at the first angular orientation and over the first solid-angle a data stream, s(t), emitted by the remote target.

6. A base device comprising:
a receiver comprising:
  an antenna comprising a scanning mode to detect:
    a channel impulse response, h(t), reflected from a remote target, wherein the channel impulse response, h(t), comprises copies of an impulse-pulse s(t) emitted by the base, each copy of the impulse-pulse s(t) provided to the remote target at a different time based on a length of a respective path traveled by the respective copy of the impulse-pulse s(t) through a communication channel between the base and the remote target;
    an amplified impulse-pulse, gs(t) reflected from the remote target, wherein the amplified impulse-pulse gs(t) comprises copies of impulse-pulses s(t) included in a transmitted amplified time reversed channel impulse response, gh(−t) provided to the remote target at the same time; and
    a data stream, s(t), emitted by the remote target; and
  an analog-to-digital converter (ADC) coupled to the antenna, the ADC to digitize the detected channel impulse response h(t) into a channel impulse response waveform;
a waveform processor communicatively coupled to the receiver, the waveform processor to reverse in time domain the channel impulse response waveform; and
an omnidirectional transmitter communicatively coupled to the waveform processor and comprising an amplifier, the omnidirectional transmitter to emit:
  the impulse-pulse, s(t); and
  the amplified time reversed channel impulse response, gh(−t).

7. A method comprising:
at a base,
  emitting an impulse-pulse s(t) in multiple directions;
  in response to emitting the impulse-pulse s(t), detecting at a first angular orientation and over a first solid-angle a channel impulse response, h(t), reflected from a remote target, wherein:
    the first angular orientation comprises first 3-D angular coordinates, (θ, φ), in a coordinate system with an origin at the base;
    the channel impulse response, h(t), comprises copies of the impulse-pulse s(t), each copy of the impulse-pulse s(t) provided to the remote target at a different time based on a length of a respective path traveled by the respective copy of the impulse-pulse s(t) through a communication channel between the base and the remote target;
  reversing in time domain the channel impulse response h(t);
  amplifying the time reversed channel impulse response h(−t); and
  transmitting in the multiple directions the amplified time reversed channel impulse response, Gh(−t).

8. A system for wireless communications, comprising:
one or more RF base stations, each RF base station being an RF transceiver that wirelessly transmits and receives RF signals; and
one or more RF target stations, each RF target station in wireless communication with the one or more RF base stations,
wherein each RF base station includes a base station receiver, a base station transmitter, an analog-to-digital converter (ADC) and a waveform processor, wherein the base station receiver includes an antenna to operate in one of a scanning mode and an omnidirectional mode,
  wherein the antenna in the scanning mode detects a channel impulse response, h(t), reflected from a RF target station and having copies of an impulse-pulse s(t) emitted by the base station transmitter, each copy of the impulse-pulse s(t) provided to the remote target at a different time based on a length of a respective path traveled by the respective copy of the impulse-pulse s(t) through a communication channel between the RF base station and the RF target station,
  wherein the antenna in the omnidirectional mode detects an amplified channel impulse response, Gh(t), based on residual portions of an amplified impulse-pulse Gs(t) reflected from the RF target station and having copies of impulse-pulses s(t) included in a transmitted amplified time reversed channel impulse response, Gh(−t) provided to the RF target station at the same time;
wherein the ADC is coupled to the antenna to digitize the detected channel impulse response h(t) into a channel impulse response waveform;
wherein the waveform processor is communicatively coupled to the receiver and to reverse in time domain the channel impulse response waveform; and
wherein the base station transmitter is an omnidirectional transmitter communicatively coupled to the waveform processor and emits the impulse-pulse, s(t); and the amplified time reversed channel impulse response, Gh(−t).

* * * * *